July 9, 1935.　　　　C. W. GANNETT　　　　2,007,444
WHEEL
Filed March 25, 1932　　　　2 Sheets-Sheet 1
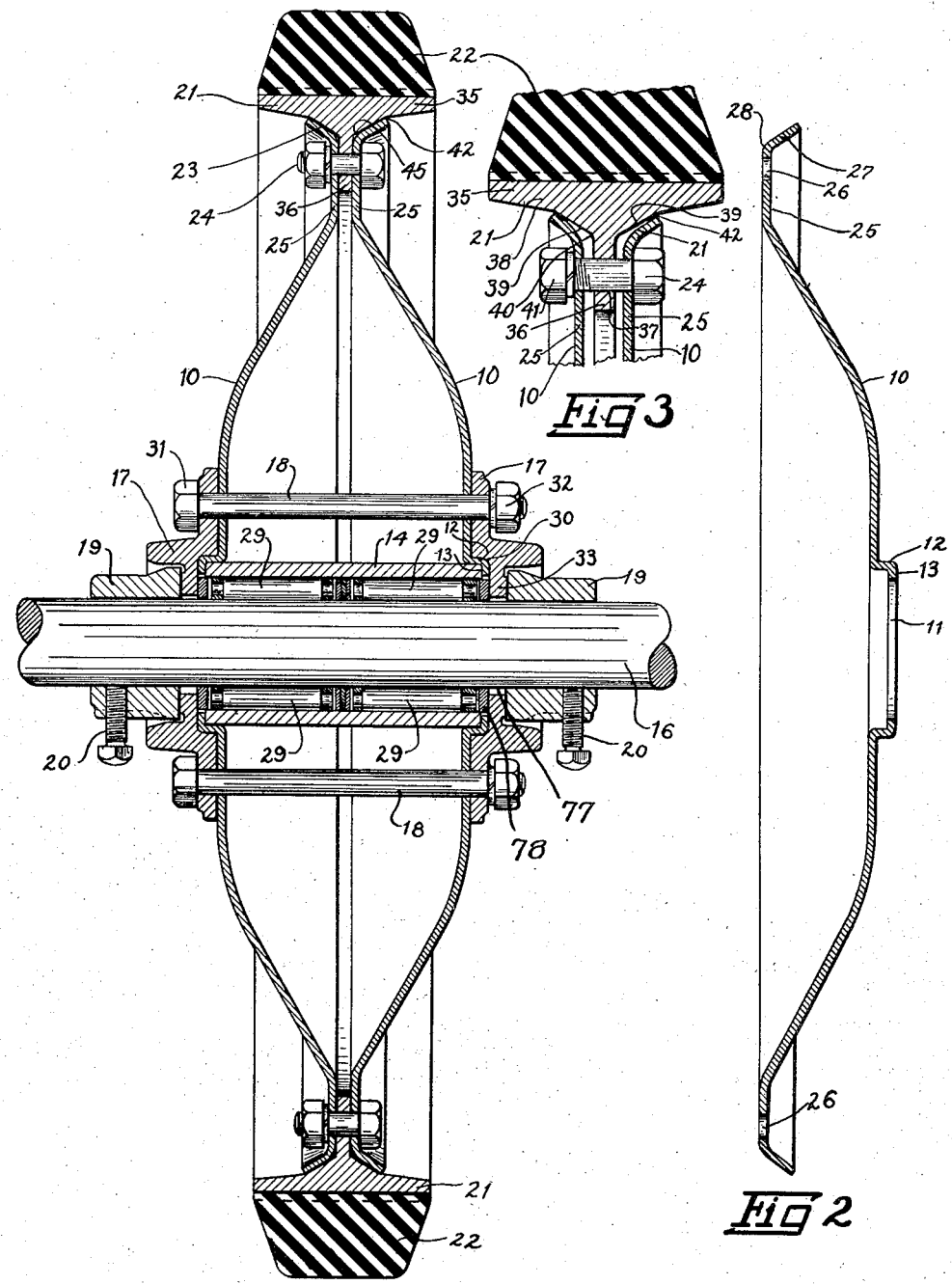
INVENTOR.
Chauncey W. Gannett
BY
Slough and Canfield
ATTORNEY.

July 9, 1935.  C. W. GANNETT  2,007,444
WHEEL
Filed March 25, 1932  2 Sheets-Sheet 2
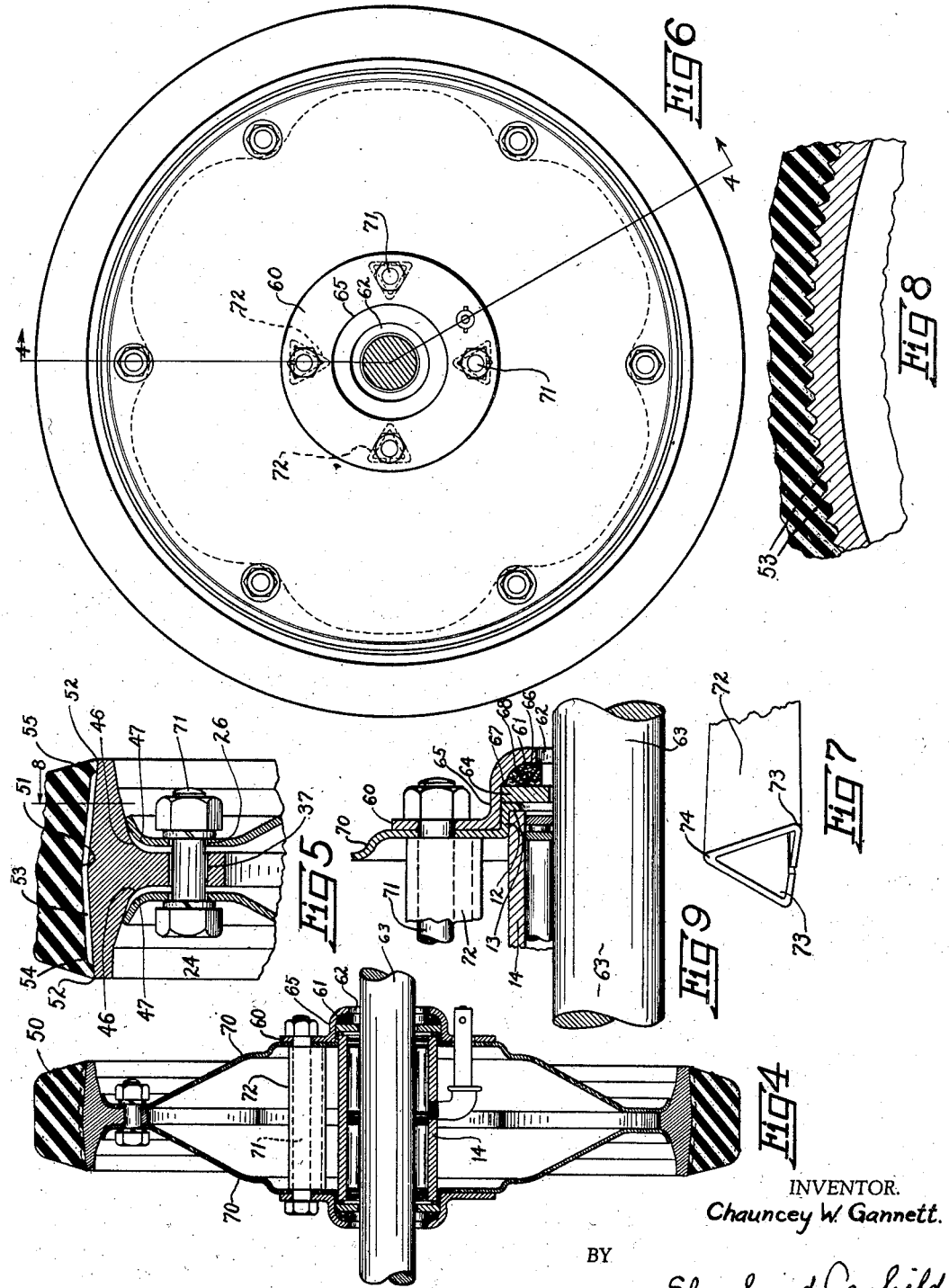
INVENTOR.
Chauncey W. Gannett.
BY
Slough and Caufield
ATTORNEY.

Patented July 9, 1935

2,007,444

UNITED STATES PATENT OFFICE 2,007,444

WHEEL

Chauncey W. Gannett, Wellington, Ohio, assignor to The Wellington Machine Company, Wellington, Ohio, a corporation of Ohio Application March 25, 1932, Serial No. 601,246

7 Claims. (Cl. 301—63)

This invention relates to wheels and particularly to wheels adapted for use upon wheelbarrows, trucks or the like.

In some aspects of my invention, it relates more particularly to wheels of the rubber tired disc type.

It is an object of my invention to provide a rubber tired wheel having an improved tire-supporting rim construction.

It is another object of my invention to provide, in a rubber tired wheel, an improved method and means of securing a rubber tire upon the rim.

Another object is to provide in a wheel of the disc type, an improved construction for effecting a juncture between the wheel disc and the wheel rim.

Another object is to provide such a joint structure wherein the disc may have a wedging engagement with the rim to facilitate the assembly of the disc and rim and to render the assembly permanent and to provide therein the maximum of strength for the minimum of material.

Another object of my invention is to provide an improved juncture between the disc and rim of a wheel whereby sufficient contact or juncture pressure between the parts may be provided in a simple manner to prevent the entrance of moisture or foreign material into the interior of the wheel, between the discs.

Another object is to provide, in a wheel of the class referred to, an improved juncture between the wheel disc edges and the rim adapted to effect a rigid and sealed juncture without the necessity of accurate machining of the joined portions of the disc and rim.

Another object of my invention is to provide a strong and durable wheel which can be made at a moderate price due to the labor-saving method of manufacture, and at the same time which will be accurate and serviceable for the purposes intended.

Another object of my invention is to provide an improved form of disc which may be employed as the central disc of a disc type wheel.

Another object of my invention is to provide an improved wheel rim for wheels generally of the disc type.

Another object is to provide an improved hub construction for wheels.

Other objects of my invention will be apparent to those skilled in the art to which my invention appertains.

My invention is fully disclosed in the following description taken in connection with the accompanying drawings, in which:

Fig. 1 is a cross-sectional view of a wheel constructed in accordance with and embodying my invention;

Fig. 2 is a detail view of the disc of the wheel of Fig. 1;

Fig. 3 is an enlarged fragmentary view of a part of Fig. 1 and showing parts thereof in a different position during the assembly thereof;

Fig. 4 is a view similar to Fig. 1 and showing a modification, the view being taken from the plane 4—4 of Fig. 6.

Fig. 5 is a view to an enlarged scale of a part of Fig. 4 illustrating the parts in the process of being assembled.

Fig. 6 is a side elevational view of the wheel of Fig. 4.

Fig. 7 is a separate view to a larger scale of a part of Figs. 4 and 6.

Fig. 8 is a fragmentary view taken from the plane 8 of Fig. 5.

Fig. 9 is a fragmentary view of a part of Fig. 4 drawn to a larger scale.

Referring to the drawings, I have shown at 10—10, a pair of similar or identical wheel discs, one of which is shown separately in Fig. 2. The disc is generally of dish-form and at its center has press-formed therein a cup-like recess, the bottom of which is perforated as at 11, and comprising a skirt portion 12 and an annular flange 13. Adjacent the periphery of the disc, it is press-formed to provide an annular planar portion 25 of substantial radial width and provided with a plurality of perforations 26 in a circular row around the axis of the disc.

Outwardly the annular portion 25 terminates in an annular flange 27 formed by pressing the metal to conform to the surface of a cone, the apex of which is on the axis of the disc and on the concave side of the disc. The flange 27 is thus generally an outwardly laterally inclined flange. The flange 27 joins the portion 25 in a rounded edge 28.

The pair of discs 10—10 of Fig. 1 are disposed concavely confronting each other and with the skirt 12 and flanges 13 embracing and supporting the opposite ends of a tubular outer race element 14 of a roller bearing construction.

Rollers 29—29 between the race element 14 and the wheel shaft 16 support the element 14 and therefore the wheel discs 10 in coaxial relation to the shaft. End plates 17—17 have concave portions indicated generally at 30 fitting cylindrically upon the skirt portion 12 and abutting axially upon the flange portion 13 of the disc; and by means of through bolts 18—18 having heads 31 engaging a portion of one clamp plate 17 and a nut 32 engaging the opposite clamp plate 17, the plates may be drawn toward each other axially and make a rigid assembly of the plates themselves, the discs 10 and the element 14.

Collars 19 may be employed, secured rigidly to the shaft 16 as by set screws 20 and their inner confronting ends may abut end thrust bearing portions 33 of the clamp plates 17 to determine the axial position of the wheel on the shaft 16.

The end plates 17 are positioned accurately coaxially with the shaft 16 by virtue of the telescopic fit of the part 30 thereof upon the skirt 12, and by the telescopic fit of the skirt 12 upon the tubular race element 14, and by the fit of the rollers between the shaft 16 and the inner wall of the race element 14. Thus, perforations such as 77 of the plates 17, encircling the shaft, may have a close fit or small clearance therewith to effect a bearing seal, retaining lubricant in the roller bearing and excluding dust and dirt therefrom. The seal may be further protected by a washer 78 closely fitting the shaft by its inner perforation, and having an outer radius sufficient to extend substantially to the inner periphery of the flange 13 which engages the end of the tubular bearing element 14. The washer 78 thus becomes in effect an inward radial extension or continuation of the flange 13 substantially to the shaft.

This application is a continuation in part of my pending application Serial No. 275,173, filed May 4, 1928 for Wheels for barrows and trucks.

At 21 I have indicated generally the wheel rim which, as illustrated, is generally of T-shape in cross-section comprising an annular felly portion 35 and an inwardly radially directed web portion 36. The web portion 36 is provided with a plurality of perforations 37 disposed in a circle and adapted to register with the perforations 26 of the wheel disc.

The inner wall 38 of the felly portion 35 is formed to provide opposite conical surfaces 39—39, these surfaces being outwardly laterally diverging, and beginning at or adjacent to the web portions 36 and extending outwardly a substantial distance which, for a purpose to be described, is preferably greater than the extent of the flanges 27 of the wheel disc. At the inner termination of the conical surfaces 39, they join the web portion 36 at annular corners 40, preferably sharper or of less radius than the corner 28 of the wheel disc hereinbefore described.

Furthermore, the angle of the conical portions 39, that is, the angle which the conical portions make with their axes, is a lesser angle than the angle which the conical flange 27 makes with its axis.

In assembling the wheel discs 10 with the rim 21, the two wheel discs are disposed relative to the rim approximately as illustrated in Fig. 3 and a plurality of bolts 24 are inserted through the registering holes 26—26 of the opposite wheel discs 10, and through the perforations 37 of the wheel rim web 36, and the nuts 41 are put on the bolts.

With the parts thus disposed approximately as in Fig. 3, the nuts 41 are gradually screwed onto the bolts 24, preferably substantially equally around the wheel, and the planular portions 25 of the discs are ultimately drawn into surface engagement with opposite sides of the web 36 as illustrated in Fig. 1.

Due to the difference of conical angle of the flanges 27 and the surfaces 39 of the rim, the outer edges of the flanges 27, as at 42, first engage the surfaces 39; and during the drawing up of the bolts 24, the edges of the flanges move inwardly over the surfaces 39 and a camming or wedging action is effected, the flanges engaging the surfaces 39 with greater and greater pressure and until finally the bolts 24 are drawn up tight, in which condition, the flanges 27 are rigidly wedged against the surfaces 39.

Particularly at the extreme peripheral edges of the flanges 27, the sliding wedging movement thereof over the surfaces 39 causes the metal of the flange to intimately engage the metal of the surfaces to effect a seal between the discs and the rim to prevent the entrance of moisture or other deleterious substances into the space between the discs 10. This seal is rendered additionally effective by the intimate contact engagement of the discs and rim throughout the extent of the flange 27, and of the web 36.

In the form of Figs. 1 and 3, there is a slight clearance space at 45 in the relatively sharp corner 40 of the rim due to the relatively larger radius or curvature of the corner 28 of the disc.

In the form of Figs. 4 and 5, the corners 46—46 of the rim corresponding to the corners 40 of the other form are of substantially the same radius as the corresponding corners 47—47 to which the discs are press-formed. In this form, therefore, when the bolts are drawn up tight, there is intimate engagement between the discs and the rim in the corners 46 as well as between the flanges 27 and surfaces 39 and between the planular portions 25 and the web 36.

I find that sufficiently intimate seal between the elements above described may be effected with parts produced by ordinary methods of manufacture and without the necessity of machining the itimately engaging parts.

Besides effecting a superior juncture between the discs and the rim, the construction above described provides a superior means to transmit load from the axle 16 to the rim. To this end, the load need not be transmitted from the discs to the bolts 24 and thence to the rim, or by this means solely as is true of prior art structures; but the load may be transmitted to the rim through the juncture above described involving the relatively large contact areas between the flanges 27 and the rim 21.

In constructions wherein the load transmission occurs through perforations and bolts, shocks upon the rim due to irregularities of the ground effect hammer blows upon the perforation edges and upon the bolts, and these portions being of relatively small contact area rapidly wear and deteriorate and result in looseness. In the construction above described, however, the load transmitting property of the wheel from the plates 10 through the bolts 24 to the rim 21 is enormously reinforced and rendered permanent and rigid by the mutually engaged conical surfaces of the flanges 27 and rim 21.

In some cases it may be desirable to insure that none of the load will be transmitted to the perforations 26 and 37 and bolt 24 and in such cases, the perforations may be large enough to clear the bolt shanks as plainly illustrated in Fig. 5.

In the preferred wheel of my invention, the rim 21 is provided with a solid rubber tire 50 and in the preferred mode of securing the tire to the rim I form the rim to be of larger diameter at its central portion, as for example at 51 than it is at its side portions as at 52—52 and I furthermore form upon the outer surface of the rim transverse ribs 53—53 which as shown in Fig. 8 may be angular in cross-section. Preferably the ribs 53 are not coextensive with the width of the rim but stop short of the sides of the rim as at 45 and at 55.

The tire 50 may be formed on its inner annular surface to conform to the rim and to the ribs 53 and thus is prevented from shifting laterally or circumferentially. Furthermore, if desired, the tire may be vulcanized directly upon the rim.

In the form of construction of Figs. 4 and 6, I provide a different construction of hub. Referring to Figs. 4 and 9, I show at 60 a generally circular clamp element constituting also a hub end element, the element 60 having at its center formed therein a cup form portion 61 the bottom of the cup being centrally perforated as at 62 to clear the shaft 63 projected therethrough and through the bearing of the wheel.

A perforated washer 64 is placed within the cup 61 and at its periphery substantially fits the inner wall of the cup so that it is prevented from bottoming in the cup by the relatively large radius corner at the bottom of the cup between the skirt portion 65 and the bottom portion proper 66 of the cup.

If desired, a narrow shoulder 67 may be formed in the inner wall of the cup 65 upon which the washer 64 may seat. Between the washer 64 and the cup bottom 66 I provide an annular ring of felt or like lubricant absorbing material 68.

The side plates or discs 70—70 of the wheel are formed similarly to the side plates or discs 10—10 of the form of Fig. 1 and therefore are provided with a cup skirt portion 12 and a cup bottom portion 13 more fully described in connection with Fig. 1. A bearing tubular element 14 similar to that of Fig. 1 is provided and disposed in and supported in the skirt and bottom portions 12 and 13 as described in Fig. 1.

The hub ends are mounted over opposite portions of the discs 70—70, with a skirt 65 of the hub end, telescoped over the skirt 12 of the disc and with the disc portion 60 of the hub end lying flat against a corresponding portion of the wheel disc 70 and with the disc 64 substantially engaging the cup bottom 13 as plainly illustrated in Fig. 4 and Fig. 9.

Bolts 71—71 are projected through aligned perforations in the flange portion 60 of the hub ends and in the discs 70—70 to draw the hub ends upon the hub structure as above described; and to determine the degree of the inward draw of the bolt and also to stiffen the hub structure and to permit the use of relatively light gauge sheet metal therein without introducing corresponding weakness, tubular spacers 72 are placed around the bolts, or rather the bolts are projected therethrough, and abut at their opposite ends upon the inner walls of the discs 70—70. The tubular spacers 72 are preferably formed as shown separately in Fig. 7 from flat sheet metal preferably by bending the sheet metal to form the corners 73—73 and then bending it to form the corner 74 so that the cross sectional shape of the spacer is triangular.

Such a tubular spacer has a relatively large end area, is exceedingly strong for the amount of material from which it is formed, and is exceedingly cheap to make by bending the same from flat strip material cut to a predetermined width. Such spacers can be made for a fraction of the cost of corresponding spacers of the prior art which are cut off in length from previously made tubing.

The hub construction described in connection with Figs. 4, 7 and 9 while generally similar to that of Fig. 1 provides a hub construction which can be made entirely from pressed sheet metal parts and therefore manufactured very cheaply but accurately.

My invention is not limited to the exact details of construction shown and described. Many changes and modifications other than those shown may be made within the scope and spirit of my invention without sacrificing its advantages.

Subject matter illustrated or described but not claimed herein may be claimed in my copending application Serial No. 748,361, filed October 15, 1934, for improvements in Wheels.

I claim:

1. A wheel comprising a pair of sheet metal oppositely disposed dished discs having central axially aligned inwardly open cups formed therein, the cup bottoms having centrally aligned perforations, a roller bearing outer raceway tube adapted to enclose roller bearing elements therein, the tube at its ends abutting upon the cup bottoms and telescopically fitting the inner side walls of the cups, clamp members having cup-shaped recesses, the inner side walls of the recesses telescopically fitting the outer side walls of said cups, the bottoms of the recesses engaging the said cup bottoms externally, the recess bottoms having central circular aligned perforations therein, radially extending flanges surrounding the clamp members, a plurality of bolts extending through the flanges and drawing them inwardly to clamp the clamp members, cups, and tube rigidly together, the telescopic fit of the tube and cups, and the telescopic fit of the cups and the clamp member recesses, accurately coaxially aligning the recess bottom perforations with the tube washers disposed substantially coplanar respectively with the cup bottoms and extending radially substantially to the inner periphery of the cup bottom perforations, whereby when a shaft is projected through the said recess bottom perforations and tube and washer inner peripheries and is supported by roller bearing elements in the tube coaxially within the tube, the said bottom perforations and washer inner peripheries may embrace the shaft with sufficiently small clearance to seal lubricant inwardly and exclude dust and dirt outwardly.

2. A wheel comprising a pair of sheet metal oppositely disposed dished discs having central axially aligned inwardly open cups formed therein, the cup bottoms having centrally aligned perforations, a roller bearing outer raceway tube adapted to enclose roller bearing elements therein, the tube at its ends abutting upon the cup bottoms and telescopically fitting the inner side walls of the cups, clamp members having cup-shaped recesses, the inner side walls of the recesses telescopically fitting the outer side walls of said cups, the bottoms of the recesses engaging the said cup bottoms externally, the recess bottoms having central circular aligned perforations therein, radially extending flanges surrounding the clamp members, a plurality of bolts extending through the flanges and drawing them inwardly to clamp the clamp members, cups, and tube rigidly together, the telescopic fit of the tube and cups, and the telescopic fit of the cups and the clamp member recesses, accurately coaxially aligning the recess bottom perforations with the tube washers disposed substantially coplanar respectively with the cup bottoms and extending radially substantially to the inner periphery of the cup bottom perforations, whereby when a shaft is projected through the said recess bottom perforations and tube and washer inner peripheries and is supported by roller bearing elements in the tube coaxially within the tube, the said bottom perforations and washer inner peripheries may embrace the shaft with sufficiently small clearance to seal lubricant inwardly and exclude dust and dirt outwardly, and the clamp members also provided with outwardly open recesses having bottoms disposed transversely of the axis and adapted to engage and abut upon end thrust shoulder portions of the thrust element which may be provided on the shaft.

3. A wheel comprising a pair of sheet metal oppositely disposed outwardly dished discs having central axially aligned inwardly open cups formed therein, the cup bottoms having centrally aligned perforations, a roller bearing outer raceway tube, roller bearing elements disposed in the tube, the tube at its ends abutting upon the cup bottoms and telescopically fitting the inner side walls of the cups, clamp members having axially extending portions engaging the outer side walls of the cups and radially extending flange portions engaging the outer faces of the discs, and having each a perforation aligned with the tube and cup perforations, whereby a shaft may be projected through the aligned perforations and the tube and be supported on the bearing elements, a plurality of bolts projected through the discs and the clamp members to draw them inwardly, and washers adapted to substantially seal the tube ends with the said shaft, disposed within the axially extending portions of the clamp members.

4. A wheel comprising a pair of sheet metal oppositely disposed outwardly dished discs having central axially aligned inwardly open cups formed therein, the cup bottoms having centrally aligned perforations, a roller bearing outer raceway tube, roller bearing elements disposed in the tube, the tube at its ends abutting upon the cup bottoms and telescopically fitting the inner side walls of the cups, clamp members having axially extending portions engaging the outer side walls of the cups and radially extending flange portions engaging the outer faces of the discs, and having each a perforation aligned with the tube and cup perforations, whereby a shaft may be projected through the aligned perforations and the tube and be supported on the bearing elements, a plurality of bolts projected through the discs and the clamp members to draw them inwardly, and washers adapted to substantially seal the tube ends with the said shaft disposed within the axially extending portions of the clamp members and substantially coplanar respectively with the cup bottoms and extending radially substantially to the inner periphery of the cup bottom perforations.

5. A wheel comprising a pair of sheet metal oppositely disposed outwardly dished discs having central axially aligned inwardly open cups formed therein, the cup bottoms having centrally aligned perforations, a roller bearing outer raceway tube, roller bearing elements disposed in the tube, the tube at its ends abutting upon the cup bottoms and telescopically fitting the inner side walls of the cups, clamp members having axially extending portions engaging the outer side walls of the cups and radially extending flange portions engaging the outer faces of the discs, and having each a perforation aligned with the tube and cup perforations, whereby a shaft may be projected through the aligned perforations and the tube and be supported on the bearing elements, a plurality of bolts projected through the discs and the clamp members to draw them inwardly, and washers adapted to substantially seal the tube ends with the said shaft disposed within the axially extending portions of the clamp members and between the outer walls of the cup bottoms and the perforated portions of the clamp members.

6. A wheel as described in claim 3 and in which shoulders are provided on the perforated portions of the clamp members and the washers within the axially extending portions of the clamp members are disposed between the outer walls of the cup bottoms and the said shoulders.

7. A wheel comprising a pair of sheet metal oppositely disposed outwardly dished discs having central axially aligned inwardly open cups formed therein, the cup bottoms having centrally aligned perforations, a roller bearing outer raceway tube, roller bearing elements disposed in the tube, the tube at its ends abutting upon the cup bottoms and telescopically fitting the inner side walls of the cups, clamp members having axially extending portions engaging the outer side walls of the cups and radially extending flange portions engaging the outer faces of the discs, and having each a perforation aligned with the tube and cup bottom perforations whereby a shaft may be projected through the aligned perforations and the tube and be supported on bearing elements in the tube, a plurality of bolts projected through the discs and the clamp members to draw them inwardly, washers adapted to substantially seal the tube ends with the said shaft disposed within the axially extending portions of the clamp members, and packing elements disposed between the washers and the perforated portions of the clamp members.

CHAUNCEY W. GANNETT.